No. 747,987. PATENTED DEC. 29, 1903.
L. J. LEE.
PNEUMATIC CONVEYER ATTACHMENT FOR FEED CUTTERS.
APPLICATION FILED JUNE 9, 1903.
NO MODEL. 2 SHEETS—SHEET 2.
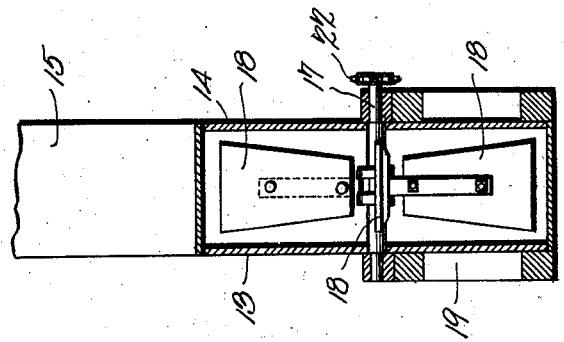
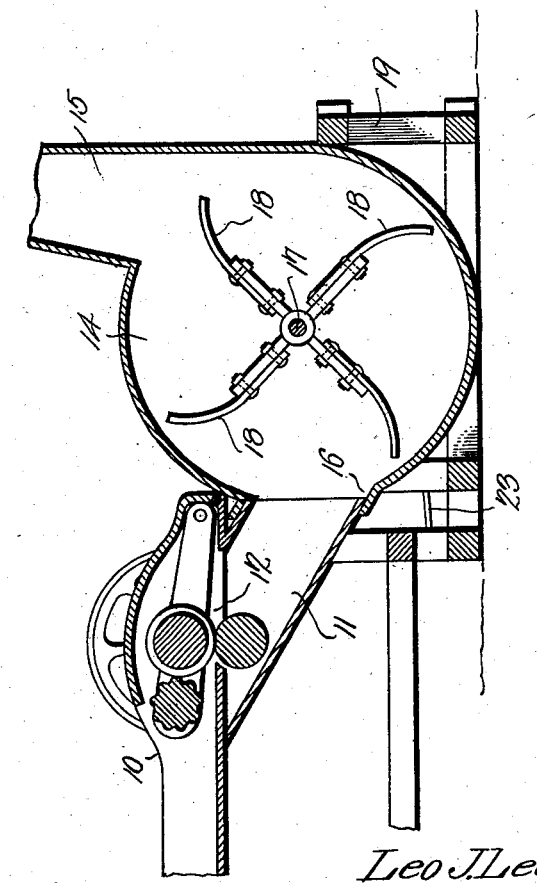
Witnesses
E. F. Stewart
C. N. Woodward
Leo J. Lee, Inventor.
by C. A. Snow & Co.
Attorneys No. 747,987. Patented December 29, 1903.

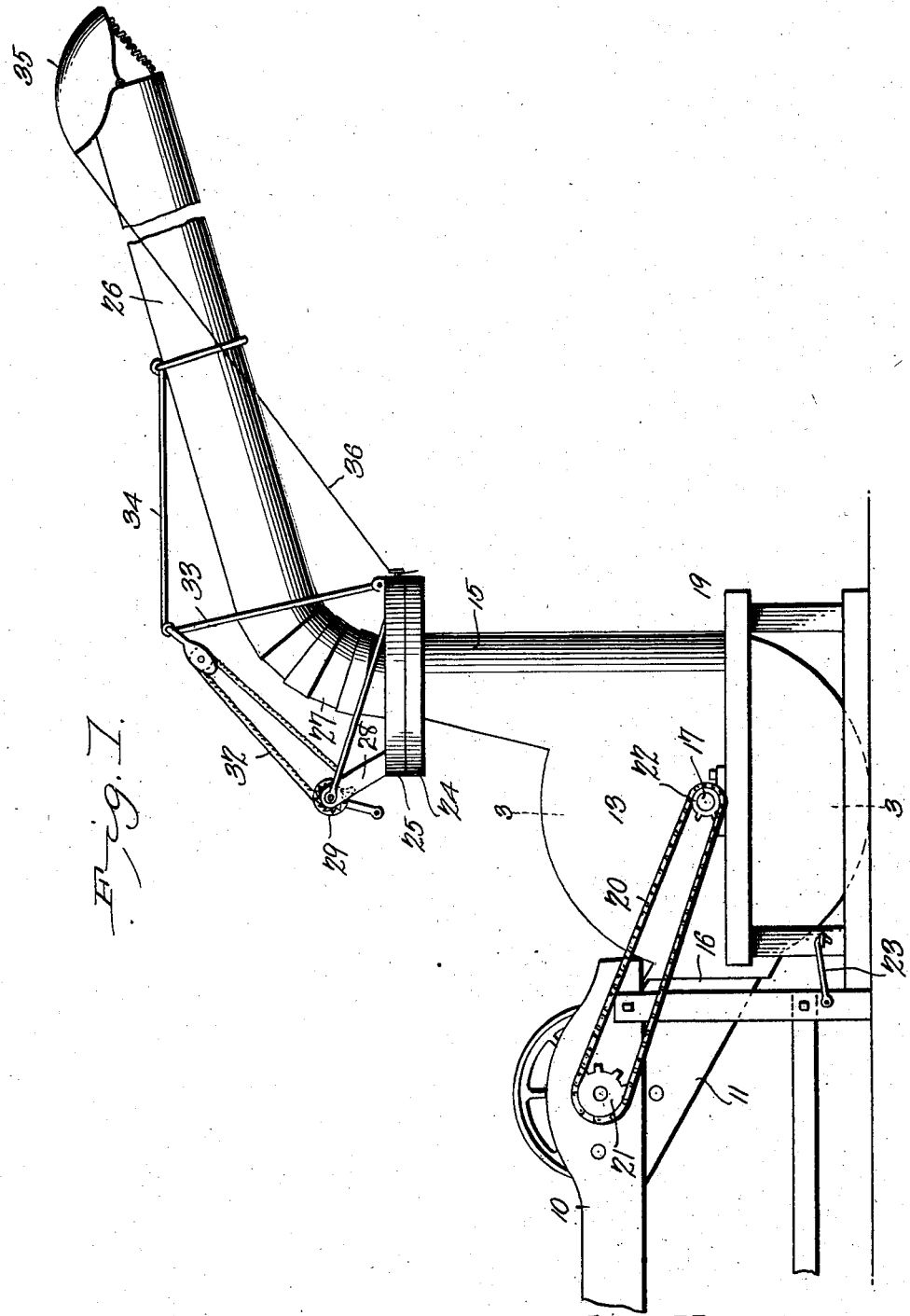

UNITED STATES PATENT OFFICE.

LEO J. LEE, OF STARK, WISCONSIN.

PNEUMATIC CONVEYER ATTACHMENT FOR FEED-CUTTERS.

SPECIFICATION forming part of Letters Patent No. 747,987, dated December 29, 1903.

Application filed June 9, 1903. Serial No. 160,771. (No model.)

*To all whom it may concern:*

Be it known that I, LEO J. LEE, a citizen of the United States, residing at Stark, in the county of Manitowoc and State of Wisconsin, have invented a new and useful Pneumatic Conveyer Attachment for Feed-Cutters, of which the following is a specification.

This invention relates to attachments for feed-cutters for the purpose of conveying the material therefrom, and has for its object to produce a simply constructed and applied device whereby the material may be conveyed to any desired point within the range thereof; and the invention consists in certain novel features of construction, as hereinafter shown and described, and specified in the claims.

In the drawings illustrative of the invention, in which corresponding parts are denoted by like designating characters, Figure 1 is a side elevation. Fig. 2 is a longitudinal sectional elevation. Fig. 3 is a transverse section on the line 3 3 of Fig. 1.

The device may be applied to any of the various makes of feed-cutters manufactured, but for the purpose of illustration is shown connected to operate with an ordinary form of such devices illustrated as a whole at 10, with its discharge-chute 11 depending below the cutter mechanism 12, as shown.

The improved device consists of a fan-casing having closed end walls 13 14 and preferably vertical tangential discharge 15 at one side and tangential inlet 16, connected to the discharge-chute 11, leading from the cutter at the opposite side, as shown. The driven shaft 17 for the fan-blades 18 is disposed centrally through the fan-casing, as shown in the usual manner; but it will be noted that there are no apertures at the "eyes" of the fan, the air entering only with the material through the chute 11. The blades 18 of the fan are curved, as shown, and disposed to receive the material directly from the chute 11 on their concaved sides and discharge it upward into the member 15 as the fan-blades are rapidly rotated. The fan-casing will be supported upon a suitable frame 19, and the fan is connected to be driven from the cutter-operating mechanism, as by chain belt 20 and sprocket-wheels 21 22. The frame 19 may be detachably connected in any suitable manner to the frame of the cutter, as by hooked rods 23 or the like, and may be modified to any required extent to adapt it to the different forms of feed-cutters manufactured.

Supported upon the upper end of the fan discharge member 15 is one member 24 of a swivel-joint, while the other or opposing swivel-joint member 25 is attached to the lower end of a conductor-spout 26, the swivel-joint providing for the laterally-swinging movement of the conductor-spout relative to the fan discharge, as will be obvious.

The lower end of the conductor-spout 26 is curved, as shown at 27, and adapted for curved telescopic adjustment, as shown in Fig. 1, so that the free end of the conductor may be adjusted vertically at the same time that it is adjusted laterally.

Attached rigidly to the swivel member 25 is a standard 28, carrying a windlass 29, having a crank-and-ratchet mechanism and from which a system of hoisting-tackle 32 leads, as shown, to the free end of a "strut" 33, resting by its lower end upon the member 25 and connected therewith. The free end of the strut 33 is also connected by a rod 34 to the conductor-pipe 26 at the rear of the swivel members, as shown. By this arrangement it will be obvious that the rotation of the windlass will elevate the outer end of the conductor-spout and enable it to be adjusted vertically to any desired extent.

The free end of the conductor-spout 26 is provided with a deflecting-hood 35, pivotally supported and under the control of the operator by means of a cord or wire 36, leading to a point convenient to the hand of the operator.

The conductor-spout 26 may be of any suitable length, and the fan and its connections may be of any suitable size or capacity, corresponding to the work to be performed thereby and the material being treated. By this simple arrangement feed of various kinds for animal consumption can be reduced and conveyed as rapidly as cut to any desired extent into storehouses or other localities.

The device will be found especially valuable for use in preparing ensilage and similar products and may be operated very rapidly and continuously, as the reduced material will be disposed of as fast as it is produced, and no clogging will be possible, as the fan receiving the material directly upon its blades will rapidly free itself and will not clog or become choked as the material all enters the fan-casing in direct alinement with its movement. I claim, therefore, an especial advantage from the peculiar arrangement of the fan-casing and the form and arrangement of the fan-blades receiving the material upon the concave side and discharging it from the convex sides.

Having thus described the invention, what I claim is—

1. The combination of a feed-cutter, a fan-casing having closed end walls and with the discharge leading tangentially from one side and adapted to receive the material from the cutter tangentially at the opposite side, the fan-blades curved radially and adapted to receive the material upon their concave sides and discharge it from their convex sides, and an extension conveyer-spout rotatively connected to said discharge, substantially as specified.

2. The combination of a feed-cutter, a fan-casing having closed end walls and with the discharge leading tangentially from one side and adapted to receive the material from the cutter tangentially at the opposite side, the fan-blades curved radially and adapted to receive the material upon their concave sides and discharge it from their convex sides, and an extension conveyer-spout connected for rotation upon said fan discharge and vertically adjustable thereon.

In testimony that I claim the foregoing as my own I have hereto affixed my signature in the presence of two witnesses.

LEO J. LEE.

Witnesses:
FRANK KENNEDY,
M. J. FLAHERTY.